(12) United States Patent
Yang et al.

(10) Patent No.: US 6,833,875 B1
(45) Date of Patent: Dec. 21, 2004

(54) MULTI-STANDARD VIDEO DECODER

(75) Inventors: Feng Yang, Plano, TX (US); Chi-Hao Yang, San Jose, CA (US); Feng Kuo, San Jose, CA (US); Chien-Chung Huang, San Jose, CA (US); Jao-Ching Lin, San Jose, CA (US)

(73) Assignee: Techwell, Inc., San Jose, CA (US)

( * ) Notice: Subject to any disclaimer, the term of this patent is extended or adjusted under 35 U.S.C. 154(b) by 0 days.

(21) Appl. No.: 09/387,389

(22) Filed: Sep. 2, 1999

(51) Int. Cl.⁷ .............................. H04N 9/78; H04N 9/66
(52) U.S. Cl. ..................... 348/665; 348/639; 348/667; 348/505; 348/542
(58) Field of Search .................. 348/625, 630, 348/450, 453, 441, 505, 507, 508, 553, 554, 542, 557, 638, 639, 645, 663, 665, 667

(56) References Cited

U.S. PATENT DOCUMENTS

| | | | | |
|---|---|---|---|---|
| 4,799,102 A | * | 1/1989 | Kobayashi | 348/639 |
| 4,875,017 A | * | 10/1989 | Sakazaki | 329/336 |
| 5,043,799 A | * | 8/1991 | Kohiyama et al. | 348/505 |
| 5,220,414 A | * | 6/1993 | Rabii et al. | |
| 5,491,520 A | * | 2/1996 | Nozawa et al. | 348/625 |
| 5,621,478 A | * | 4/1997 | Demmer | 348/639 |
| 5,790,205 A | * | 8/1998 | Pettitt et al. | 348/329 |
| 6,034,735 A | * | 3/2000 | Senbongi et al. | 348/505 |
| 6,441,860 B1 | * | 8/2002 | Yamaguchi et al. | 348/555 |

OTHER PUBLICATIONS

Floyd M. Garner, "Interpolation in Digital Modems—Part I: Fundamentals", IEEE Transaction on Communications, vol. 41, No. 3, Mar. 1993.*

* cited by examiner

Primary Examiner—Sherrie Hsia
(74) Attorney, Agent, or Firm—Dinh & Associates

(57) ABSTRACT

A video decoder for decoding a composite video signal. The decoder includes an analog-to-digital converter (ADC), an input resampler, and a Y/C separator, all coupled in series. The ADC receives and digitizes the composite video signal to generate ADC samples. The input resampler receives and resamples the ADC samples with a first resampling signal to generate resampled video samples. The Y/C separator receives and separates the resampled video samples into luminance and chrominance components. The Y/C separator includes a delay element configured to receive the resampled video samples and provide a variable amount of delay. The variable amount of delay can be adjustable from line to line, and is typically based on an approximated duration of a video line. For an NTSC signal, the variable delay is select to be (m·n+m/2) samples, where m is a ratio of frequencies of the resampling signal and a color subcarrier of the composite video signal, and n is an integer selected such that (m·n+m/2) samples most approximate the duration of a video line. For a PAL signal, the variable delay is selected to be (m·n+3m/4) samples.

43 Claims, 12 Drawing Sheets

MULTI-STANDARD VIDEO DECODER

BACKGROUND OF THE INVENTION

The present invention relates to video processing, and more particularly to a multi-standard video decoder having improved performance for standard and non-standard composite video signals.

Color video information is often transmitted and stored as a composite (or CVBS) signal that includes a luminance component (Y), a chrominance component (C), a blanking signal, and vertical and horizontal synchronization signals. The luminance component expresses the intensity (i.e., black to white) of a picture, and the chrominance component expresses color and its intensity. The chrominance component is generated by modulating a subcarrier signal with two color difference components (either U and V, or I and Q, depending on the color format being used). The phase and amplitude of the modulated signal determines the color and the intensity, respectively. The chrominance component is then added to, or superimposed over, the luminance component to generate the "active" portion of the composite signal.

A composite video signal typically conforms to one of several standards, such as NTSC (National Television Systems Committee), PAL (phase alternation each line), or SECAM (sequential color with memory) standards. Each video standard covers particular geographic regions, with the NTSC standard being used in the United States and Japan, the PAL standard being used in South America and Europe, and the SECAM standard also being used in Europe. Each of these standards defines the format and characteristics of the composite video signal, such as the line (or horizontal) frequency and duration, the color subcarrier frequency, the color modulation format, and so on. Each standard also defines the relationship between the color subcarrier frequency ($f_{SC}$) and the line frequency ($f_H$). For a video signal that conforms to a standard, the line frequency can be determined if the color subcarrier frequency is known, and vice versa.

Some common video signals do not exactly conform to the video standard. For example, a video signal from a VCR includes general NTSC characteristics, but can have line duration that varies from line to line. This may be due to, for example, imprecision in the mechanical arrangements used to advance the tape during recording or playback. In addition, the color subcarrier frequency in a VCR video signal is typically not related to the line frequency, as specified by the video standards.

The composite signal format facilitates transmission and storage of video information. The composite signal is decomposed or decoded into a (Y, U, V) or (R, G, B) format suitable for display on a television or monitor. These output formats are known in the art.

For a composite signal that conforms to a standard (e.g., NTSC), digital decoding is conventionally achieved by first sampling the composite video signal with a clock signal from a clock source. The clock source is typically locked to either the line frequency (i.e., for a line-locked decoder architecture) or the subcarrier frequency (i.e., for a burst-locked decoder architecture) of the video signal with a phase lock loop (PLL). The sampling frequency is selected to be $k \cdot f_H$ for the line-locked architecture and $m \cdot f_{SC}$ for the burst-locked architecture. For an NTSC-compliant signal, k is typically 910 and m is typically 4.

Conventional video decoders typically employ either the line-lock or burst-lock architecture for decoding the composite video signal. The burst-lock architecture can allow for a simplified color demodulator design, since the video signal is sampled at m times the color subcarrier frequency. However, the burst-lock architecture is not optimal for some applications. For example, for non-standard video signals such as those from VCRs, the burst-lock architecture can generate different number of samples for each horizontal line, which can cause misalignment in the decoded picture. Also, since each standard specifies a different subcarrier frequency, the burst-lock architecture typically requires multiple crystals to support multiple standards.

The line-lock architecture can generate a fixed number of samples for each video line, which solves the problem of picture misalignment for non-standard video signals. However, since the sampling frequency is not locked to the color subcarrier, color demodulation is typically more complicated.

Accordingly, video decoding techniques that provide improved performance for standard and non-standard composite video signals are highly desirable. It is also desirable that these techniques support different video standards and are (relatively) simple to implement.

SUMMARY OF THE INVENTION

The invention provides video decoding techniques that provide improved picture quality for standard and non-standard video signals. For improved color separation (i.e., demodulation) of non-standard video signals, a comb filter having a variable delay can be used. To provide a properly aligned decoded picture with a non-standard video input signal, the decoded output components can be generated with a time offset, as described below. The timing and resampling signals can be provided by one or more PLLs having multiple operating modes, with each mode having particular loop characteristics and better suited for some input signal conditions. The video signal can also be resampled with a burst-locked front end and resampled again with a line-locked back end.

An aspect of the invention provides a video decoder for decoding a composite video signal. The video decoder includes an analog-to-digital converter (ADC), an input resampler, and a Y/C separator, all coupled in series. The ADC receives and digitizes the composite video signal to generate ADC samples. The input resampler receives and resamples the ADC samples with a first resampling signal to generate resampled video samples. The YIC separator receives and separates the resampled video samples into luminance and chrominance components. The Y/C separator includes a delay element that receives the resampled video samples and provides a variable amount of delay. For improved performance, the Y/C separator can be implemented with an adaptive comb filter.

The variable amount of delay can be adjustable from video line to video line, and is typically based on an approximated duration of the video line. For an NTSC signal, the variable delay is select to be (m·n+m/2) samples, where m is a ratio of frequencies of the first resampling signal and a color subcarrier of the composite video signal, and n is an integer selected such that (m·n+m/2) samples most approximate the duration of the video line. For a PAL signal, the variable delay is selected to be (m·n+3m/4) samples. For ease of color demodulation, the first resampling signal is locked to the color bursts of the composite video signal and has a frequency that is four times that of the color bursts.

The video decoder can further include a color demodulator that receives and demodulates the chrominance component from the Y/C separator into color difference components. The video decoder can further include an output resampler that receives and resamples the luminance and color difference components with a second resampling signal to generate output video components. The video decoder typically includes additional circuitry for providing the required timing and resampling signals.

Another aspect of the invention provides a video decoder for decoding a composite video signal. The video decoder includes an input sampling circuit, a color decoder, and a skew compensation circuit, all coupled in series, and a timing circuit coupled to the input sampling circuit. The input sampling circuit receives and digitizes the composite video signal to generate video samples. The color decoder receives and decodes the video samples to generate decoded video components. The timing circuit receives the video samples and generates a control signal indicative of an approximated time difference between the start of a video line and a burst phase of the video line. The skew compensation circuit receives the decoded video components and the control signal and generates output video components having a time offset based on the time difference indicated by the control signal.

In an embodiment, the input sampling circuit includes an ADC coupled to an input resampler. The ADC receives and digitizes the composite video signal to generate ADC samples. The input resampler receives and resamples the ADC samples with a first resampling signal to generate the video samples. For ease of color demodulation, the first sampling signal is locked to the color burst of the composite video signal. In an embodiment, the color decoder includes a Y/C separator coupled to a color demodulator. The Y/C separator receives and separates the video samples into luminance and chrominance components. The color demodulator receives and demodulates the chrominance component into color difference components.

Yet another aspect of the invention provides a video decoder for decoding a composite video signal. The video decoder includes an input sampling circuit coupled to a color decoder and a timing circuit. The input sampling circuit receives and digitizes the composite video signal with a first sampling signal to generate video samples. The color decoder receives and decodes the video samples to generate decoded video components. The timing circuit receives a reference clock signal and generates the first sampling signal. The timing circuit includes a phase lock loop (PLL) that receives the reference clock signal and a mode control signal and is configurable to operate in one of a number of operating modes indicated by the mode control signal.

In an embodiment, the plurality of operating modes is associated with different loop characteristics, and includes a fast mode and a slow mode. The fast mode is characterized by a fast loop response and the slow mode is characterized by a slow loop response. The PLL can be configurable to switch to the fast mode when an averaged PLL phase error exceeds a particular threshold.

Yet another aspect of the invention provides a video decoder for decoding a composite video signal. The video decoder includes an input resampler, a Y/C separator, a color demodulator, and an output resampler, all coupled in series. The input resampler receives and resamples input video samples with a first resampling signal to generate resampled video samples. The input video samples are generated by digitizing the composite video signal, and the first resampling signal is locked to color bursts of the composite video signal. The Y/C separator receives and separates the resampled video samples into luminance and chrominance components. The color demodulator receives and demodulates the chrominance component into color difference components. The output resampler receives and resamples the luminance and color difference components with a second resampling signal to generate output video components. The second resampling signal is locked to a line rate of the composite video signal.

The first and second resampling signals can be generated using first and second PLLs, respectively. Each PLL can be designed to operate in one or a number of operating modes, with each mode corresponding to different loop characteristics.

The Y/C separator can be implemented with a comb filter or an adaptive comb filter having a variable amount delay. To align the decoded picture, the output resampler can also be designed to generate output video components that takes into account a time difference between the start of a video line and the color burst phase of the video line.

The invention can be implemented in hardware, software, or a combination thereof.

The foregoing, together with other aspects of this invention, will become more apparent when referring to the following specification, claims, and accompanying drawings.

DESCRIPTION OF THE SPECIFIC EMBODIMENTS

For simplicity, the invention is described, to a large extent, in conjunction with the INTSC standard and the color difference components (U and V). However, the invention can be applied to other standards including PAL and SECAM. In addition, the invention can be used to provide other color difference components including I and Q.

Figure 1:
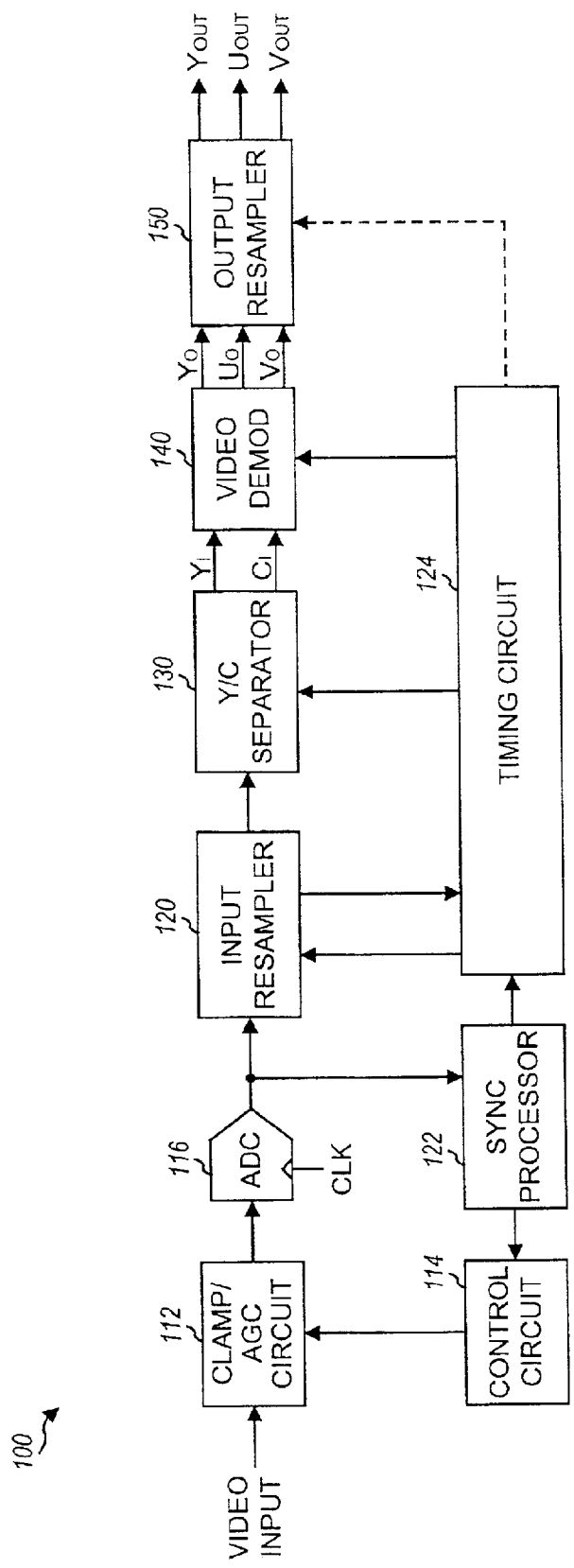
FIG. 1 shows a simplified block diagram of an embodiment of a video decoder that incorporates the video decoding techniques of the invention.

FIG. 1 shows a simplified block diagram of an embodiment of a video decoder 100 that incorporates the video decoding techniques of the invention. As shown in FIG. 1, the composite video input signal is provided to a clamp/AGC (automatic gain control) circuit 112 that clamps and scales the signal in accordance with a set of control signals from a control circuit 114 The clamped and AGCed signal is provided to an analog-to-digital converter (ADC) 116 that samples the signal with a clock signal CLK having a particular sampling frequency $f_{SAMP}$. The video samples are provided to an input resampler 120 and a sync processor 122

Resampler 120 resamples the video samples with a first resampling signal from a timing circuit 124, as described below, and provides the resampled video samples to a Y/C separator 130. Generation of the signals used for resampling is described in detail below. The resampled video samples are composite video samples that include both luminance (Y) and chrominance (C) components. Y/C separator 130 separates the luminance and chrominance components from the composite samples, and provides the separated components ($Y_I$ and $C_I$) to a video demodulator (DEMOD) 140. Demodulator 140 further processes the luminance component ($Y_I$), demodulates the chrominance component ($C_I$) into color difference components (e.g., U and V, or I and Q), and provides the processed components to an output resampler 150. Resampler 150 resamples the components with a second resampling signal from timing circuit 124, as described below. The resampled components from resampler 150 comprise the output components $Y_{OUT}$, $U_{OUT}$, and $V_{OUT}$. The blocks in FIG. 1 are described in further detail below.

Figure 2A:
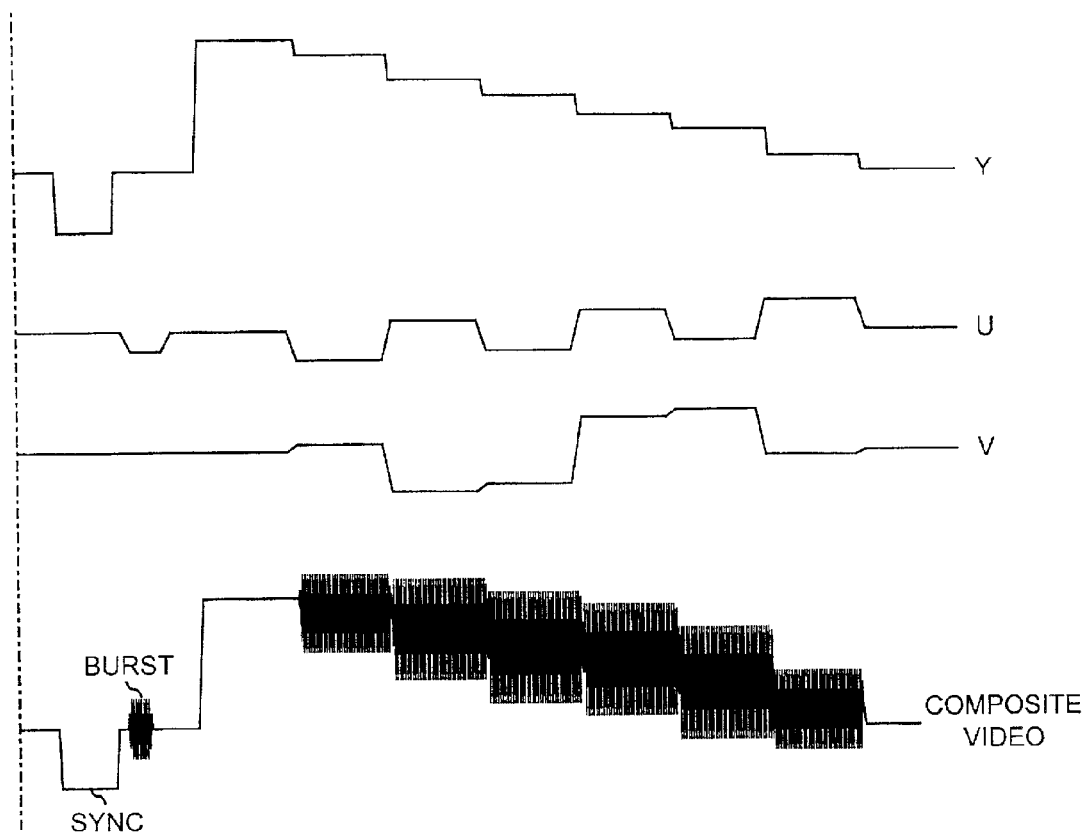
FIG. 2A shows a diagram of a composite video signal for a color bar test signal and its decomposed luminance (Y) and color difference components (U and V)

FIG. 2A shows a diagram of a composite video signal for a color bar test signal and its decomposed luminance (Y) and color difference (U and V) components. The signals shown in FIG. 2A cover one horizontal video line. The composite video signal includes a horizontal sync pulse, a color burst, and an active video portion.

The composite video signal typically conforms to one of the standards noted above, which defines the characteristics of the signal. For example, for an NTSC signal, the horizontal synchronizing (H-sync) pulse has an amplitude of 40 IRE and a duration of 4.7 µsec, and the color burst has an amplitude of 40 IRE peak-to-peak and a duration of 9.0 cycles. IRE is the unit used to measure the amplitude of a video signal. Also, for NTSC, the color burst start 5.3 µsec from the falling edge of the H-sync pulse. The NTSC standard is further defined by various standards from the Electronic Industries Associated (EIA).

Figure 2B:
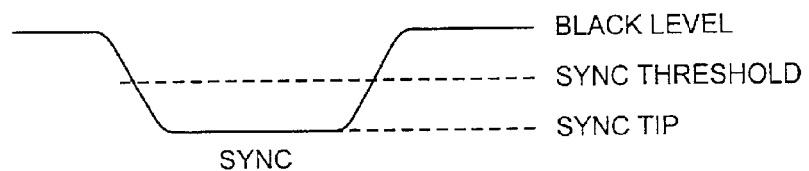
FIG. 2B shows a diagram of an exploded view of a horizontal sync pulse.

FIG. 2B shows a diagram of an exploded view of the horizontal sync pulse. The horizontal sync pulse starts at a blanking level, transitions to a sync tip level, and returns to the blanking level. For an NTSC-compliant signal, the blanking level is 0 IRE, the sync tip is −40 IRE, and the H-sync duration is 4.7 µsec. In an embodiment, the H-sync pulse can be detected by counting consecutive video samples that fall below a sync threshold value (e.g., −20 IRE), as described below.

Referring back to FIG. 1, clamping and scaling are performed on the composite video input signal to provide a processed signal having a proper amplitude and DC level for sampling by ADC 116. This processing ensures that the video signal is not clipped by the ADC. In an embodiment, clamping is achieved by adding an offset (e.g., an offset voltage) to the input video signal such that the blanking level of the clamped video signal is maintained at a first particular level. In an embodiment, AGC is achieved by scaling the clamped video signal such that the sync tip is maintained at a second particular level. Control circuit 114 generates the control signals used for clamping and scaling. Clamping and scaling can also be performed using other techniques, and this is within the scope of the invention.

In a specific embodiment, the processed video signal is sampled by ADC 116 with a sampling clock having a fixed frequency $f_{SAMP}$. The sampling frequency $f_{SAMP}$ is selected to satisfy the Nyquist criterion, and is at least twice the bandwidth of the processed signal. In a specific implementation, the sampling frequency is set at approximately 27.0 MHz, although other frequencies can also be used. The sampling frequency can be asynchronous with the line and subcarrier frequencies. For improved decoding performance, the sampling clock is derived from a stable clock source (e.g., a voltage controlled crystal oscillator (VCXO), a PLL locked to a stable clock, or other sources) to provide low-jitter video samples for standard and non-standard input video signals.

Sync processor 122 detects the horizontal and vertical synchronizing pulses in the video signal and generates horizontal and vertical (H/V) sync signals indicative of the detected sync pulses. These sync signals are used by other circuits for timing, synchronization, and control, as described below.

Figure 3A:
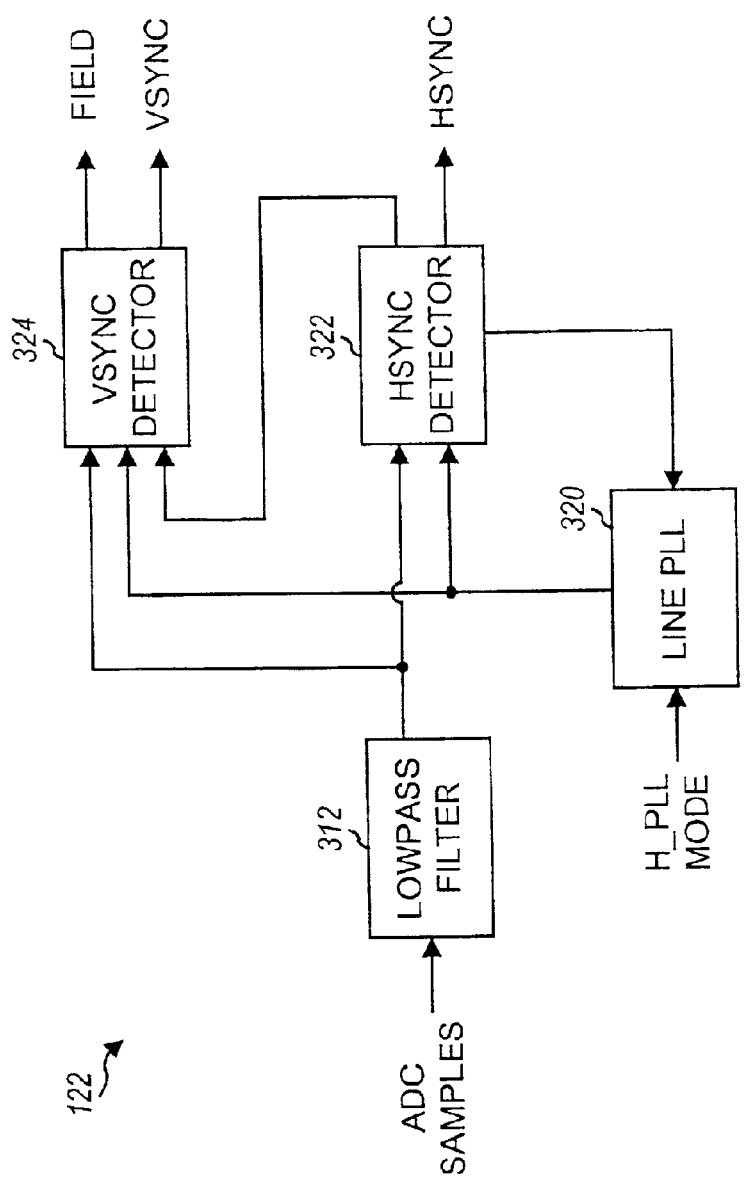
FIG. 3A shows a block diagram of an embodiment of a portion of a sync processor.

FIG. 3A shows a block diagram of an embodiment of a portion of sync processor 122 As shown in FIG. 3A, the ADC samples from ADC 116 are provided to a lowpass filter 312 that suppresses high frequency components and smoothes out the sync pulse edges. The filtered samples are provided to a line PLL 320, a horizontal sync (HSYNC) detector 322, and a vertical sync (VSYNC) detector 324. HSYNC detector 322 detects the falling edges of the sync pulses and provides an HSYNC signal that indicates the detected horizontal sync pulses. Similarly, VSYNC detector 324 detects the vertical sync pulses and provides a VSYNC signal.

In a specific embodiment, horizontal sync detection is performed by counting consecutive filtered samples (e.g., with an up-down counter) whose levels are below a first amplitude threshold (e.g., −20 IRE). If the count reaches or exceeds a first count value, a horizontal sync pulse is declared. For example, for an embodiment in which the filtered samples are sampled at 27 MHz, a horizontal sync pulse can be declared if at least 80 consecutive samples below −20 IRE are detected. The count value may be programmable for increased flexibility. Additional circuitry can be provided to minimize false detection, such as circuitry to disable the HSYNC detector for a particular time duration after detecting a valid horizontal sync pulse. In an embodiment, HSYNC detector 322 includes a "free-wheel" mechanism that continues to generate the horizontal sync signal, even when no horizontal sync pulses are detected, based on a clock signal from PLL 320.

VSYNC detector 324 detects the vertical sync pulses. Vertical sync detection can be performed in a manner similar to the horizontal sync detection, i.e., by counting filtered samples whose levels are below the first amplitude threshold. If the count reaches or exceeds a second count value, a vertical sync pulse is declared. When the location of the detected vertical sync pulse is close to a detected horizontal sync pulse, a frame start or odd field is indicated. In an embodiment, an odd/even field bit toggles between detected fields of the video signal, and this bit is changed if inconsistency is detected for more than a particular number of fields.

In an embodiment, PLL 320 generates a timing signal that is locked to the horizontal sync pulses. In a specific embodiment, PLL 320 supports two operating modes, a fast mode and a slow mode, as determined by a control signal H_PLL MODE. The fast mode has a wide loop bandwidth and provides improved tracking of fast changes in the line frequency of the video signals (such as those from VCRs and especially during fast forward and reverse). Additional circuitry is provided to allow for effective synchronization of the clock signal in diverse situations. The slow mode has a narrow loop bandwidth and provides reduced timing jitter due to signal noise when decoding stable video signals (such as those from a broadcast TV station or a DVD player).

In an embodiment, PLL 320 further includes a mechanism that allows the PLL to automatically switch between the operating modes based on, for example, the long-term average phase error from the PLL, as described below. If the average phase error exceeds a particular error threshold, PLL 320 switches to the fast mode. Otherwise, PLL 320 operates in the slow mode.

Figure 3B:
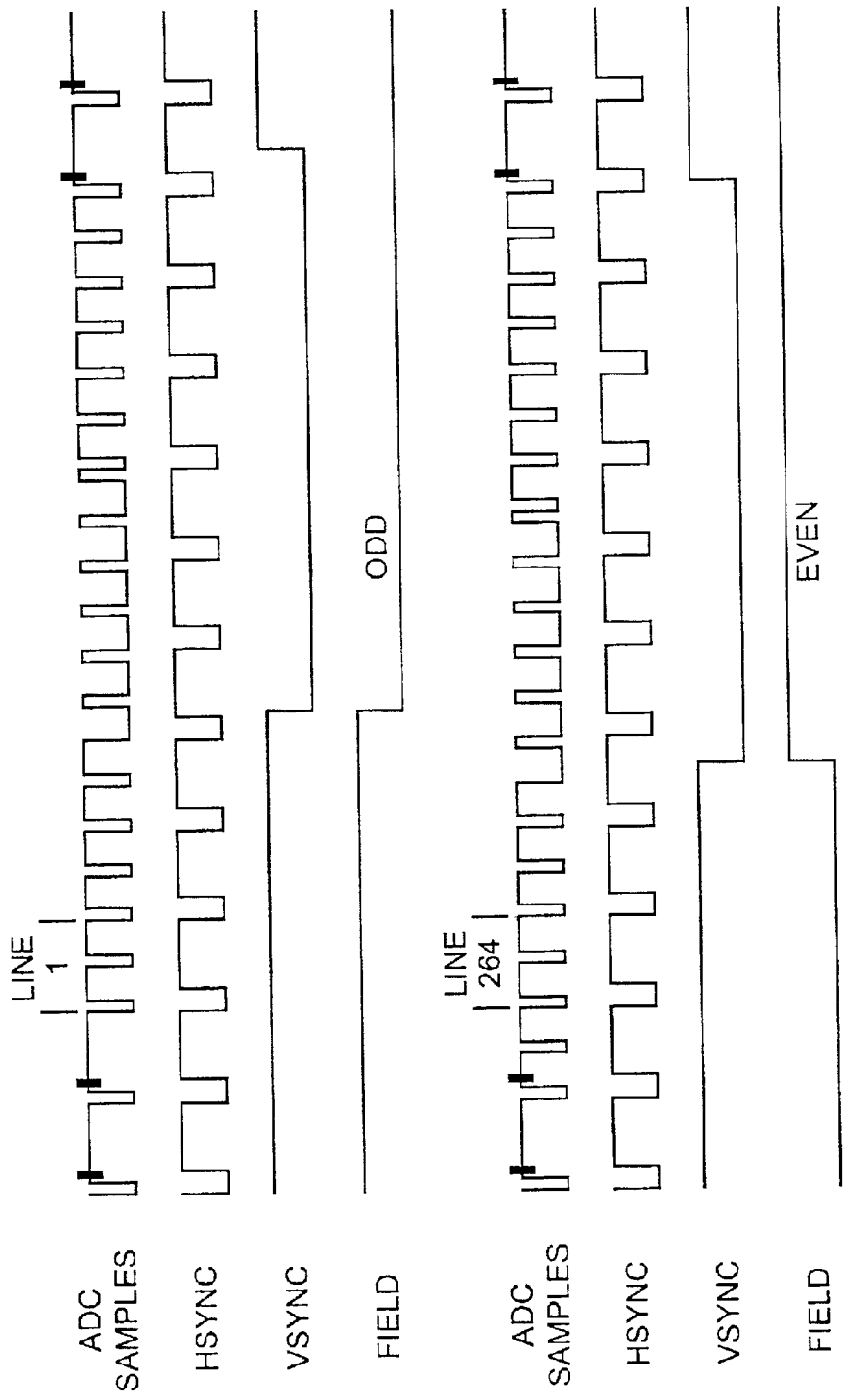
FIG. 3B is a timing diagram that shows the input video signal and the signals generated by the sync processor.

FIG. 3B is a timing diagram that shows the input video signal and the signals generated by sync processor 122. As shown in FIG. 3B, the HSYNC signal includes a sync pulse for each video line. The VSYNC signal is low during vertical synchronization and high otherwise. The FIELD signal toggles between odd and even fields.

Figures 4A, 4B:
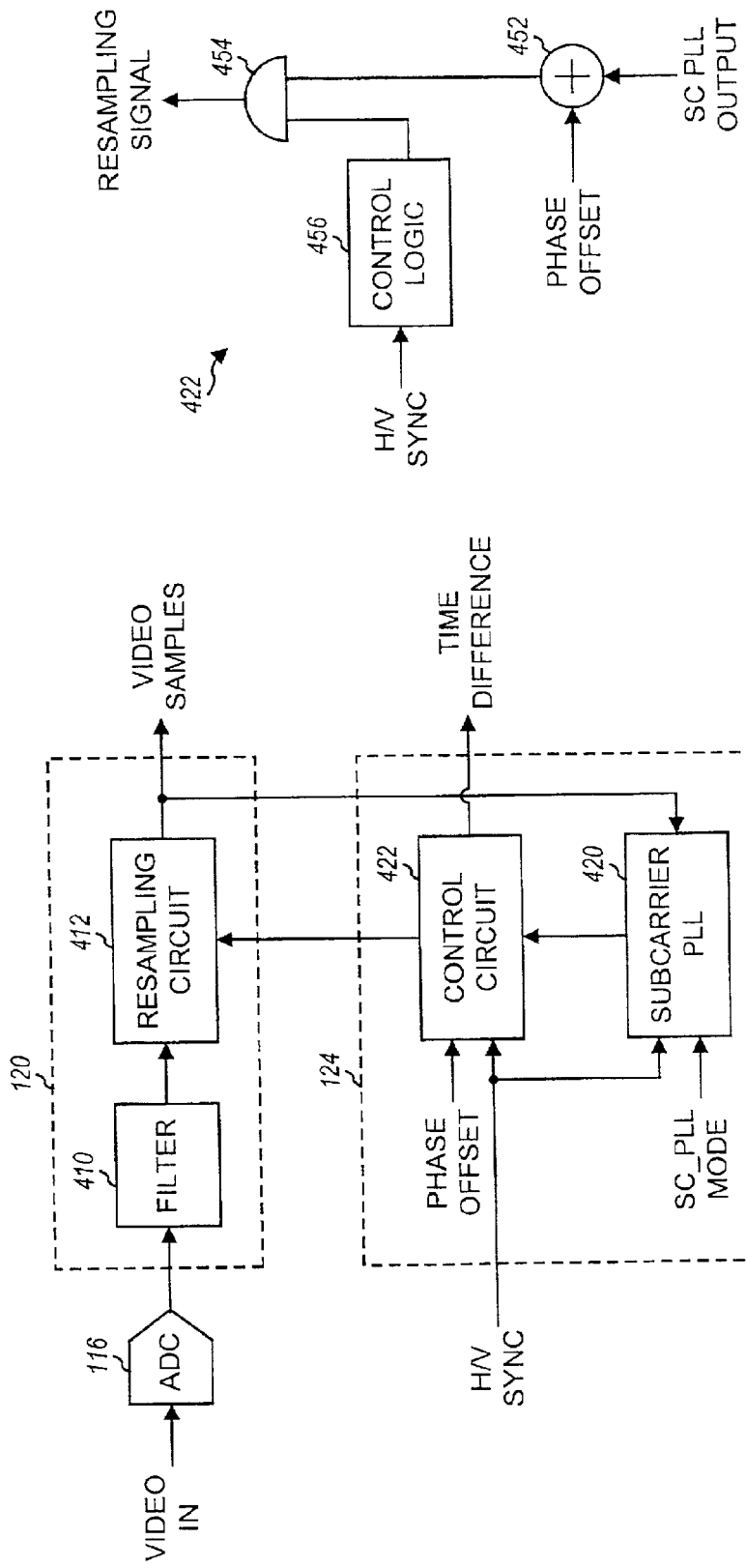
FIG. 4A shows a simplified block diagram of an embodiment of an input resampler.
FIG. 4B shows a block diagram of an embodiment of a section of a control circuit that generates the resampling signal for the input resampler.

FIG. 4A shows a simplified block diagram of an embodiment of input resampler 120. Resampler 120 receives video samples at the sample rate $f_{SAMP}$ and generates resampled video samples at a first resampled rate $f_{R1}$. In an embodiment, the resampling frequency $f_{R1}$ is related to the subcarrier frequency, or $f_{R1} = m \cdot f_{SC}$, where m is an integer greater than two. By selecting a resampling frequency that is related to the subcarrier frequency by an integer, the resampled video samples can be easily demodulated, as described below. Color demodulation is simplified when m is an even integer, and is preferably four. Input resampler 120 effectively implements a burst-lock front end for the video decoder.

As shown in FIG. 4A, the video samples from ADC 116 are provided to an (optional) anti-aliasing filter 410 within resampler 120. Filter 410 is a lowpass filter that removes high frequency components to prevent aliasing during resampling. The video samples include spectral components from DC to $0.5 \cdot f_{SAMP}$. When the resampling frequency is lower than the sampling frequency, the higher spectral components alias and fold inband during resampling. For example, if the resampling frequency is four times the subcarrier frequency, or $f_{R1} = 4 \; f_{SC} = 14.318$ MHz, and the sampling frequency $f_{SAMP} = 27.0$ MHz, the spectral portion from 7.159 MHz to 13.5 MHz aliases during resampling. This spectral portion would constitute noise in the resampled video signal. Filter 410 removes the spectral portion that can alias during resampling, and its bandwidth BW is selected based, in part, on the resampling frequency, or BW<$f_{R1}/2$.

The filtered samples are provided to a resampling circuit 412. In a specific embodiment, resampling circuit 412 is a linear interpolator that generates (or interpolates) samples at the resampling rate $f_{R1}$. Each interpolated sample y[i] is based on two filtered samples x[i] and x[i+1] and a phase difference k[n] between the resampling signal and the ADC sampling clock for that particular sample y[i]. Resampling circuit 412 can also be implemented using third and higher order interpolators, or with other resampling architectures, and this is within the scope of the invention.

Linear and higher order interpolation are further described in two papers entitled "Interpolation in Digital Modems—Part I: Fundamentals," by Floyd M Gardner, IEEE Transactions on Communications, Vol. 41, No. 6, June 1993, and "Interpolation in Digital Modems—Part II: Implementation and Performance," by Floyd M Gardner, IEEE Transactions on Communications, Vol. 41, No. 3, March 1993, both of which are incorporated herein by reference.

A subcarrier PLL 420 generates a timing signal used for resampling. PLL 420 receives the horizontal and vertical sync signals (H/V SYNC) from sync processor 122 and the resampled video samples from resampling circuit 412. In an embodiment, PLL 420 includes a numerically controlled oscillator (NCO) that generates a synthesized clock signal based, in part, on a stable clock signal (e.g., the sampling clock). The frequency of the clock signal from PLL 420 is phased locked to the color bursts in the input video signal. Implementation of PLL 420 is further described below.

The H/V SYNC signals are used by PLL 420 to generate windows during which detection of color bursts is enabled. As noted above, the color burst typically begins a particular time period after the falling edge of the horizontal sync signal. The H/V SYNC signals are also used by PLL 420 to enable the PLL during time intervals when valid color bursts are detected.

A control circuit 422 provides the resampling signal to resampling circuit 412. The resampling signal is dependent on the timing signal from PLL 420, and may be further dependent on a phase offset value (e.g., provided by the user). The phase offset value allows the user to change the tint of the decoded picture. For an embodiment in which the resampling circuit is implemented with an interpolator, the resampling signal determines the weighting factor for each of the samples used to generate the interpolated (or resampled) sample.

FIG. 4B shows a block diagram of an embodiment of a section of control circuit 422 that generates the resampling signal. A summer 452 receives the output from PLL 420 and the phase offset value, combined the two received inputs, and provides the result to one input of an AND gate 454. In an embodiment, a control logic 456 receives the H/V SYNC signals, generates a window that is logic high for the duration of each active video line except during the sync pulse, and provides the window to the other input of AND gate 454. AND gate 454 generates the resampling signal based on the two inputs. Thus, in an embodiment, the color bursts and active video portion, but not the sync pulse, are resampled. This feature can be particularly advantageous for providing 1024 samples (instead of 1135 samples) for each PAL video line, which can reduce the memory requirement to 1K byte for each active video line.

In an embodiment, control circuit 422 further includes circuitry (not shown in FIG. 4B) that computes, for each active video line, a time difference between the start of the video line (e.g., which is defined as the falling edge of the horizontal sync pulse) and the color burst phase. The color burst phase can be determined as the phase of the first resampled video sample in the video line after the falling edge of the horizontal sync pulse, as described below. This time difference represents the misalignment in the picture, which is typically more pronounced for a non-standard video signal. The time difference is provided to output resampler 150 for adjustment and alignment of the picture, as described below.

Figure 4C:
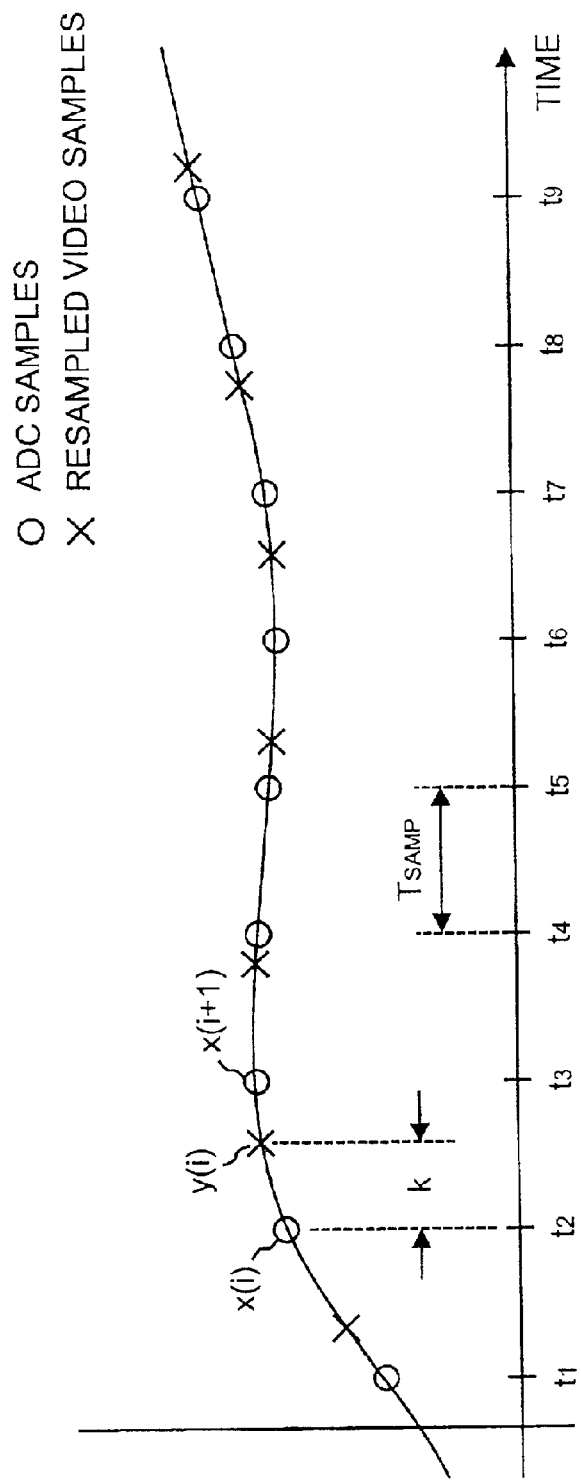
FIG. 4C shows a diagram that illustrates the resampling performed by the input resampler.

FIG. 4C shows a diagram that illustrates the resampling performed by input resampler 120. As shown in FIG. 4C, the ADC samples (represented by "o"s) are uniformly spaced by $T_{SAMP}$, which is inversely related to the sampling frequency (or $T_{SAMP}=1/f_{SAMP}$). The ADC samples are resampled by input resampler 120 to generate resampled video samples (represented by "x"s). For a linear interpolator, resampling is achieved in accordance with the following:

$$y[i] = x[i] + (x[i+1] - x[i])\frac{k}{T_{SAMP}}, \qquad \text{Eq. (1)}$$

where y[i] is the interpolated or resampled video sample, x[i] and x[i+1] are the ADC samples used to interpolate y[i], and k is the time or phase difference between the output samples y[i] and the ADC sample x[i]. The circuitry used to implement input resampler 120 is known in the art and not described in detail herein.

In actual circuit implementations, the resampling signal is typically synthesized from another clock signal (e.g., the ADC clock signal CLK). The ADC clock signal may thus be used to provide both the ADC samples and the resampled video samples. Since the resampling frequency is typically less than the ADC sampling frequency ($f_{R1}<f_{SAMP}$), some periods of the clock signal CLK will not be associated with valid resampled video samples. In the diagram shown in FIG. 4C, a resampled video sample is clocked out at $t_1$, $t_2$, $t_3$, $t_5$, $t_6$, $t_7$, $t_9$, and so on. No resampled video samples exist at $t_4$ and $t_8$. The circuit implementation details to process samples at "virtual" resampling rates based another clock signal (e.g., the ADC clock signal CLK) are known in the art and not described herein.

The resampled video samples from input resampler 120 are "composite" samples that include both luminance (Y) and chrominance (C) components. Y/C separator 130 receives and separates the composite samples into luminance and chrominance samples.

In accordance with the NTSC standard, the color subcarrier frequency $f_{SC}$ (NTSC) is related to the line frequency $f_H$ by the following:

$$f_{SC}(NTSC) = 227.5f_H, \text{ or } 4f_{SC} = 910f_H. \qquad \text{Eq. (2)}$$

As shown by the first half of equation (2), for an NTSC-compliant video signal, there are 227.5 color burst cycles per horizontal line, and the color bursts are 180° out-of-phase between consecutive video lines. Thus, by delaying the samples by one video line and adding samples of the current line with delayed samples of an immediately preceding line, the chrominance component approximately cancels out and the luminance component is obtained. Similarly, by subtracting samples of the current line from delayed samples of the immediately preceding line, the luminance approximately cancels out and the chrominance component is obtained.

In accordance with the PAL standard, the color subcarrier frequency $f_{SC}$ (PAL) is related to the line frequency $f_H$ by the following:

$$f_{SC}(PAL) = 283.75f_H \text{ or } 4f_{SC} = 1135f_H. \qquad \text{Eq. (3)}$$

As shown by the first half of equation (3), for a PAL-compliant video signal, there are 283.75 color burst cycles per horizontal line, and the color bursts are 90° out-of-phase between consecutive video lines. Thus, by delaying the samples by one video line and plus-or-minus one sample period, and adding samples of the current line with appropriately delayed samples of an immediately preceding line, the chrominance component approximately cancels out and the luminance component is obtained. Similarly, by subtracting samples of the current line from appropriately delayed samples of the immediately preceding line, the luminance approximately cancels out and the chrominance component is obtained.

Figure 5A:
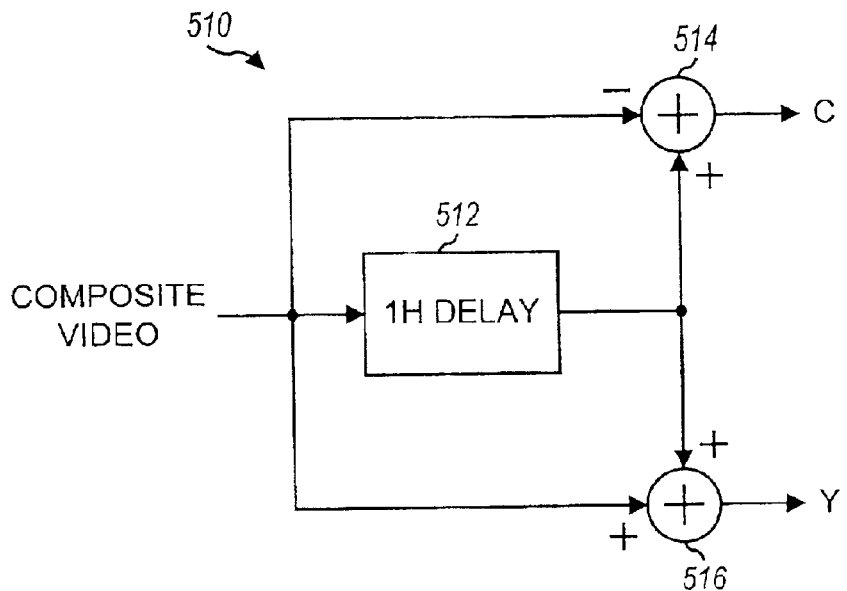
FIG. 5A shows a block diagram of an embodiment of a conventional comb filter used for Y/C separation.

FIG. 5A shows a block diagram of an embodiment of a conventional comb filter 510 used for Y/C separation. The composite video samples are provided to a delay element 512 and summers 514 and 516. Delay element 512 provides one horizontal line of delay, which is a fixed number of samples or a fixed time period for a conventional comb filter. For example, for an NTSC-compliant signal that is sampled at four times the subcarrier frequency, delay element 512 provides 910 samples of delay. The composite samples are subtracted from the delayed samples by summer 514 to provide the chrominance (C) samples, and the composite samples are added to the delayed samples by summer 516 to provide the luminance (Y) samples.

As noted above, for non-standard video signals such as those from VCRs, the line duration can vary from line to line. When the line is sampled with a burst-lock architecture, such at that performed by input resampler 120, each non-standard video line can include any number of samples.

Figure 5B:
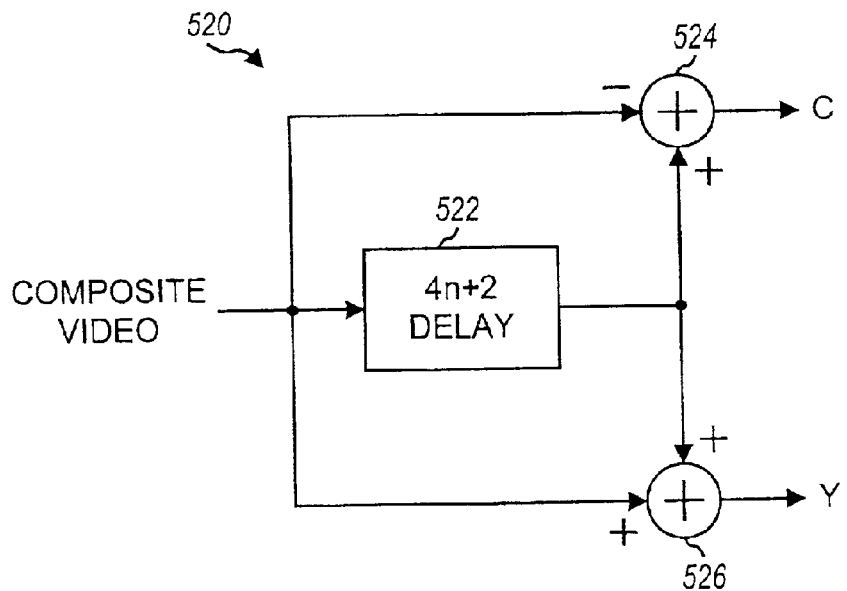
FIG. 5B shows a block diagram of an embodiment of a comb filter used for Y/C separation in accordance with an aspect of the invention.

FIG. 5B shows a block diagram of an embodiment of a comb filter 520 used for Y/C separation in accordance with an aspect of the invention. The composite video samples are provided to a delay element 522 and summers 524 and 526. In an embodiment, for NTSC decoding, delay element 522 provides (m·n+m/2) samples of delay, where m is the ratio of the frequencies of the resampling signal and the color subcarrier (i.e., $m=f_{R1}/f_{SC}$) and n is an integer. For an NTSC-compliant signal that is sampled at four times the subcarrier frequency, m=4, n=227, and delay element 522 provides (4n+2) or 910 samples of delay. However, when decoding a non-standard video signal, n is selected to be an integer such that (m·n+m/2) most approximates the duration of the line. The line duration can be determined from the detected horizontal sync pulse at the start of each video line.

For PAL decoding, delay element 522 provides (m·n+3m/4) samples of delay. For a PAL-compliant signal that is sampled at four times the subcarrier frequency, m=4, n=283, and delay element 522 provides (4n+3) or 1135 samples of delay.

Comb filter 520 can provide a better approximation of the luminance and chrominance components for non-standard video signals than conventional comb filter 510. Comb filter 520 provides a variable amount of delay that is dependent on the actual duration of the video line. The delay provided by comb filter 520 has at most ±2 samples of error from the actual video line length, and this error can be much less than that of a conventional comb filter having a fixed number of samples of delay. Since most non-standard video signals have line duration that varies slowly from line to line, the ±2 samples of error is tolerable, or not objectionable, in most instances.

FIG. 5B shows a simplified block diagram of a comb filter used to separate Y and C components from composite samples. This block diagram highlights the variable delay aspect of the comb filter.

Figure 5C:
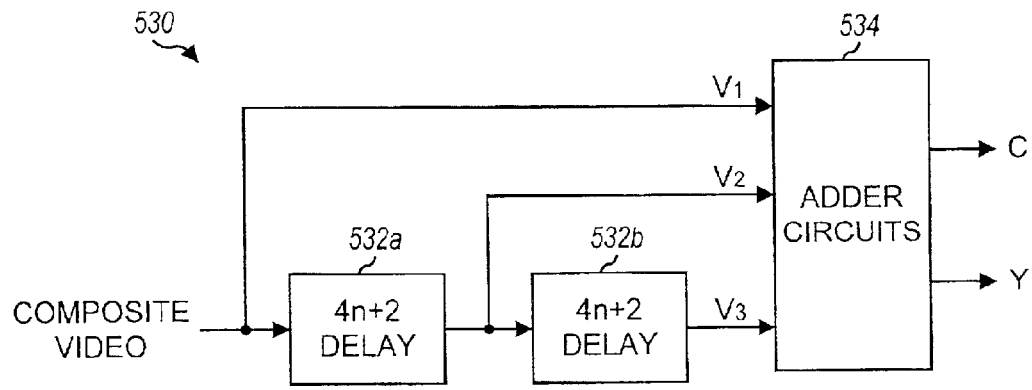
FIG. 5C shows a block diagram of an embodiment of an adaptive comb filter used for Y/C separation in accordance with an aspect of the invention.

FIG. 5C shows a block diagram of an embodiment of an adaptive comb filter 530 that provides improved performance for Y/C separation. In accordance with an aspect of the invention, adaptive comb filter 530 incorporate delay elements 532 having variable amounts of delay. The composite video samples are provided to delay element 532a and further to delay element 532b. In an embodiment, each delay element 532 provides (m·n+m/2) samples of delay for NTSC decoding and (m·n+3m/4) samples of delay for PAL decoding, with m and n being integers selected in similar manner as for comb filter 520. For an NTSC signal that is sampled at four times the subcarrier frequency, m=4, n=227, and delay element 522 provides (4n+2) samples of delay. The composite video samples and the delayed samples from delay elements 532a and 532 (comprising the video signals V1, V2, and V3, respectively, as shown in FIG. 5C) are provided to adder circuits 534 that appropriately combine the samples to generate the luminance (Y) and chrominance (C) components.

Figure 5D:
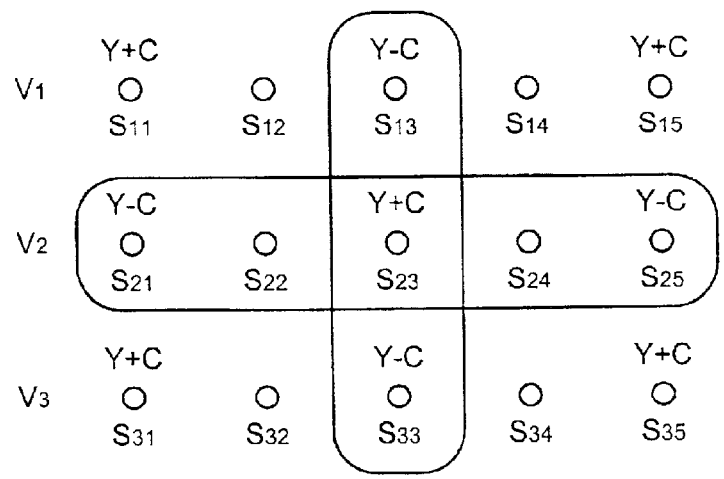
FIG. 5D shows a representation of the samples from video signals V1, V2, and V3 from the adaptive comb filter.

FIG. 5D shows a representation of the samples from the video signals V1, V2, and V3 The video signal V1 includes a sequence of video samples labeled as $S_{11}, S_{12}, S_{13}, S_{14}, S_{15}$, and so on, the video signal V2 includes a sequence of video samples labeled as $S_{21}, S_{22}, S_{23}, S_{24}, S_{25}$, and so on, and the video signal V3 includes a sequence of video samples labeled as $S_{31}, S_{32}, S_{33}, S_{34}, S_{35}$, and so on For an NTSC signal, the video signals in adjacent lines are 180° out-of-phase. Also, when the NTSC signal is sampled at four times the subcarrier frequency, each sample is 90° out-of-phase with respect to the adjacent samples on the same video line. Horizontal comb filtering can be achieved as follows:

$$C=(2S_{23}-S_{21}-S_{25})/4,$$

and $$Y=S_{23}-C. \quad \text{Eq. (4)}$$

Similarly, vertical comb filtering can be achieved as follows:

$$C=(2S_{23}-S_{13}-S_{33})/4,$$

and $$Y=S_{23}-C. \quad \text{Eq. (5)}$$

Adder circuits 534 perform the computations shown by equation (4) or (5) depending on whether horizontal or vertical comb filtering is selected.

Adaptive comb filter 530 can provide improved Y/C separation with small cross-coupling of the luminance component to the separated chrominance component, and vice versa, at both horizontal and vertical edges. Horizontal (or vertical) adaptive comb filtering can provide improved performance when a horizontal (or vertical) line exists in the video picture. In a simple implementation, the selection between horizontal and vertical comb filtering is achieved by detecting the amount of change in the amplitude of the samples in the vertical and horizontal directions. For example, vertical comb filtering can be performed if the amplitude difference in the vertical direction is less than the amplitude difference in the horizontal direction, as shown by the following:

$$|S_{13}-S_{33}|<|S_{21}-S_{25}|. \quad \text{Eq. (6)}$$

The amplitude difference shown by equation (6) is a simple criterion shown for illustration. Other criteria can also be used to select the comb filtering mode and are within the scope of the invention. For example, criteria can be selected to better detect diagonal lines in the video picture.

FIG. 5C shows a simple embodiment of an adaptive comb filter that advantageously employs the variable delay aspect of the invention. Specifically, the adaptive comb filter provides improved performance when the line delay is allowed to vary such that the adjacent video lines are approximately 180° out-of-phase. Other types and implementations of adaptive comb filters can also be designed and are within the scope of the invention. For example, another adaptive comb filter that can be used with the invention is disclosed in U.S. Pat. No. 5,220,414, which is incorporated herein by reference.

Figure 6:
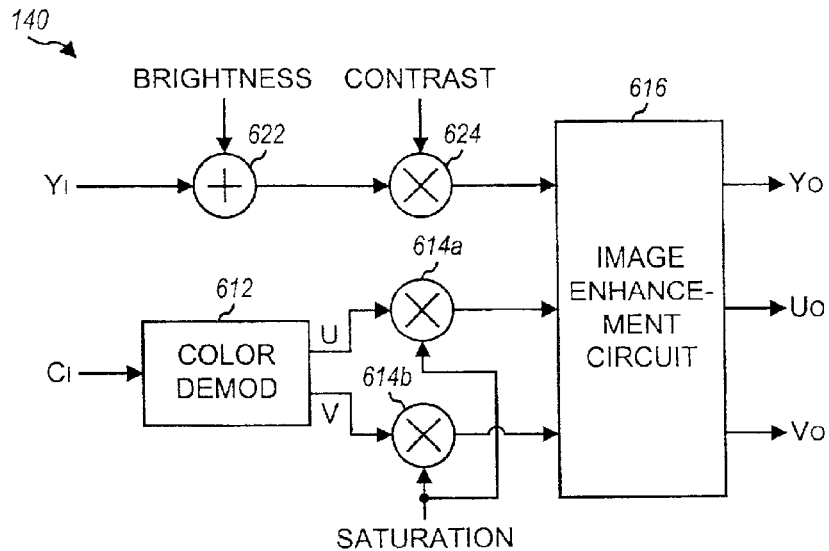
FIG. 6 shows a block diagram of an embodiment of a video demodulator.

FIG. 6 shows a block diagram of an embodiment of video demodulator 140. Video demodulator 140 receives and processes the luminance ($Y_I$) and chrominance ($C_I$) components from Y/C separator 130 and generates luminance ($Y_O$) and color difference ($U_O$ and $V_O$) components.

For an implementation in which the video samples are resampled at four times the subcarrier frequency, demodulation of the chrominance component can be easily achieved with a demultiplexer and a signal inversion circuit. At four times the subcarrier frequency, the inphase (i.e., cosine) sinusoid can be expressed as (1, 0, −1, 0, 1, 0, . . . ) and the quadrature (i.e., sine) sinusoid can be expressed as (0, 1, 0, −1, 0, 1, . . . ). The chrominance samples can be viewed as comprising the following sequence of samples (U, V, −U, −V, U, V, . . . ). Thus, every other chrominance sample can be provided as the U color difference sample, with alternate U color difference samples being inverted. Similarly, the remaining chrominance samples are provided as the V color difference samples, again with alternate V color difference samples being inverted. This simple color demodulation scheme is possible since burst-lock resampling is performed prior to color demodulation.

As shown in FIG. 6, the chrominance ($C_I$) component is provided to a color demodulator 612 that demodulates the color component in the manner described above. The chrominance component can be bandpass filtered prior to demodulation to reduce chrominance noise. The output color difference components U and V are provided to multipliers 614a and 614b, respectively, that also receive a saturation value. Each multiplier 614 scales the received color difference component with the saturation value and provides the scaled component to an image enhancement circuit 616.

Multipliers 614 can be used to implement a chrominance automatic gain control (AGC) loop that adjusts the chrominance level to account for high frequency roll-off that is common in many video systems. The chrominance AGC loop can evaluate the amplitude of the color bursts and adjust the chrominance component such that the color burst amplitude is maintained at a particular signal level (e.g., +20 IRE). Multipliers 614 can also be used to allow for adjustment of the chrominance saturation.

The luminance ($Y_I$) component is provided to a summer 622 that adds a brightness level to $Y_I$. The brightness adjusted Y is provided to a multiplier 624 that scales the received Y with a contrast level. The scaled Y is provided to image enhancement circuit 616.

Image enhancement circuit 616 performs additional signal processing on the luminance and color difference components. Additional processing on the luminance and color difference components can include sharpening and cornering to compensate for the limited signal bandwidth at the encoder.

Figure 7A:
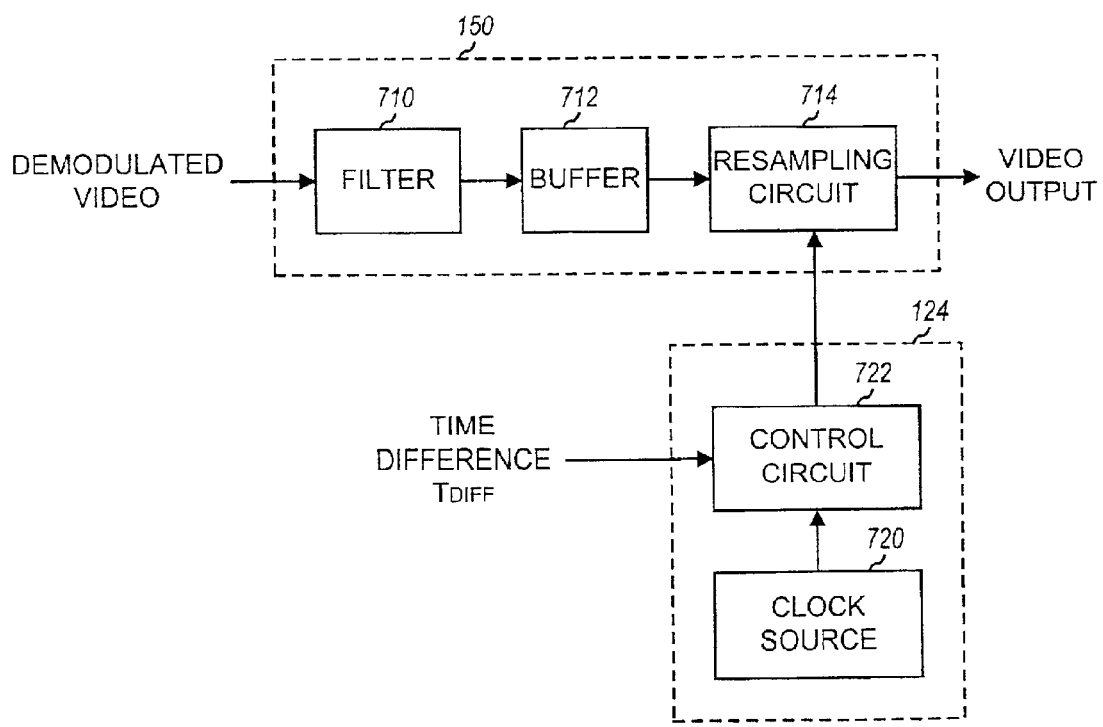
FIG. 7A shows a simplified block diagram of an embodiment of an output resampler.

FIG. 7A shows a simplified block diagram of an embodiment of output resampler 150. Resampler 150 receives and resamples the demodulated video samples from video demodulator 140 to provide output video samples. In accordance with an aspect of the invention, the output video samples are also realigned in time to remove any picture misalignments caused by the input resampling, as described below.

Within resampler 150, the demodulated video samples are provided to an (optional) lowpass filter 710 that removes high frequency components to prevent aliasing when resampling to a lower output sample rate. The filtered samples are provided to a buffer 712 that provides the necessary buffering. The size of the buffer depends on the type of resampling being performed (e.g., horizontal resampling or vertical resampling, or both). The buffered samples are provided to a resampling circuit 714 that performs the resampling. In an embodiment, resampling circuit 714 is a linear interpolator that generates (or interpolates) samples at the output sample rate $f_{R2}$. Each interpolated sample $z[i]$ is based on two filtered samples, $d[i]$ and $d[i+1]$, and a phase difference $k[i]$ between the output sample $z[i]$ and the filtered sample $d[i]$. Resampling circuit 714 can also be implemented using higher order interpolators, or with other resampling architectures, and this is within the scope of the invention.

Resampler 150 receives samples at an input sample rate $f_{R1}$ and generates resampled video samples at an output sample rate $f_{R2}$. In one specific embodiment, the output sampling rate $f_{R2}$ is determined by an external clock source provided to video decoder 100. In another specific embodiment, the output sampling rate is fixed at a particular frequency, and can be generated as a fraction of a reference clock such at the sampling clock for ADC 116. In yet another specific embodiment, the output sampling rate is determined by a PLL that is locked to the line rate of composite video input signal. These embodiments can be used to support various applications. Video decoder 100 can be designed to support any combination of output resampling schemes described above and other output resampling schemes.

Figure 7B:
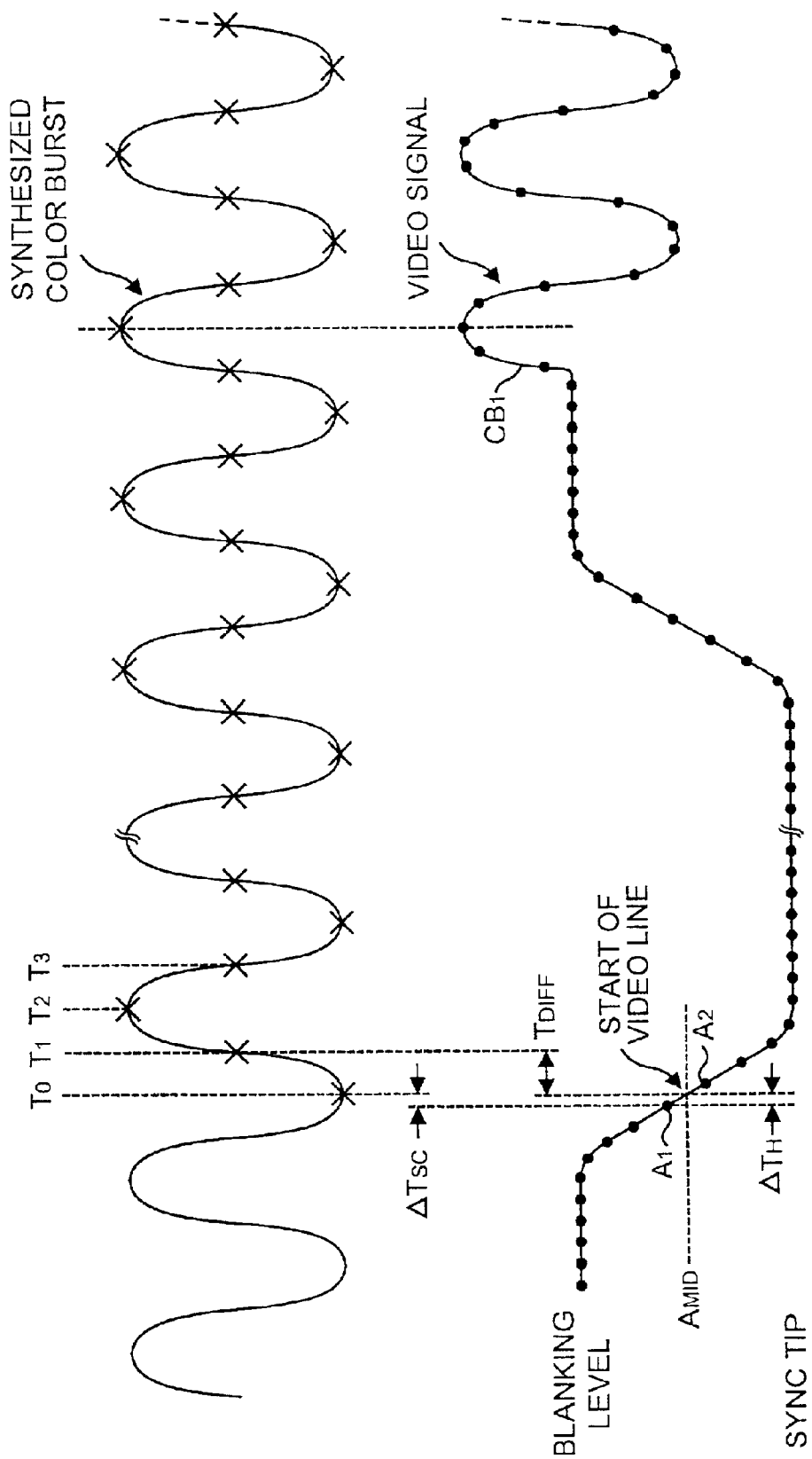
FIG. 7B shows a diagram that illustrates the picture misalignment caused by the input resampler.

FIG. 7B shows a diagram that illustrates the picture misalignment caused by input resampler 120. The video signal is initially sampled by ADC 116 to provide ADC samples, which are represented by the "o"s in the video signal. The ADC samples are subsequently resampled by input resampler 120 with an input resampling signal to generate resampled video samples. In the embodiment in which the input resampling signal has a frequency that is four times that of the color burst and is locked to the phase of the color burst, the input resampling signal can be used to generate resampled video samples at the times indicated by the "x"s in the synthesized color burst shown in the upper half of FIG. 7B.

In an embodiment, the first resampled video sample of the video line is selected as the first sample after the start of the video line and at the proper color burst phase. In an embodiment, the video line is defined to start at the falling edge of the horizontal sync at a point mid way between the blanking level and the sync tip level (e.g., $A_{MID}$=−20 IRE). For an NTSC video signal, the color burst phase of a particular video line is either 0° or 180°. As shown in FIG. 7B, the first color burst cycle $CB_1$ initially transitions positive and the color burst phase is 0° for this video line. The first resampled video sample is then taken at time $T_1$, which is the first 0° color burst phase after the start of the video line. If the color burst phase had been 180° (i.e., if the first color burst cycle had transitioned negative), the first resampled video sample would have been taken at time $T_3$, which is the first 180° color burst phase after the start of the video line. First resampler 120 generates resampled video samples having the proper frequency (e.g., 4 $f_{SC}$) and phase (i.e., burst locked) such that color demodulation can be easily achieved.

After the color demodulation and post processing, the luminance and color difference components are provided to the output and eventually displayed. The input resampling signal is burst locked and may be asynchronous with the horizontal timing (i.e., the first resampled video sample may not align with the start of the video line). If this is the case, the output video picture can be misaligned if the resampled video samples of the video lines are displayed without realignment. In other words, if the first resampling video sample of each video line is considered the start of the line in the output video, a sawtooth jag would appear on the left side of the picture. The amount of misalignment would progressively increase from zero (0.0) to one resampled pixel (e.g., $T_{R1}$), and then back to zero. In accordance with an aspect of the invention, the resampled video samples are properly "realigned" at the output, as described below.

When the ADC sampling clock is not line locked with the video signal, a phase error exists between the sampling clock and the video line. In an embodiment, the video line is defined to start at $A_{MID}$ on the falling edge of the horizontal sync. The phase error of the ADC sampling clock, denoted as $\Delta T_H$, can be determined, for example, by interpolating the ADC samples before and after $A_{MID}$ (e.g., ADC samples $A_1$ and $A_2$) as follows:

$$\Delta T_H = T_{SAMP}\left(\frac{A_1 - A_{MID}}{A_1 - A_2}\right). \quad \text{Eq. (7)}$$

The input resampling signal is phase locked to the color burst of the video signal, and may not be synchronous or aligned with the ADC sampling clock. Typically, the input resampling signal is synthesized (i.e., generated) from the ADC sampling clock or a clock used to generate the ADC sampling clock. At the time of ADC sample $A_1$, the phase difference $\Delta T_{SC}$ between the ADC sampling clock and the input resampling signal can be determined. The first resampled video sample is computed at either time $T_1$ or time $T_3$, depending on whether the color burst phase is 0° or 180°, respectively, for that particular video line. The time difference between the first resampled video sample and the start of the video line, denoted as $T_{DIFF}$, can be computed as follows:

$$T_{DIFF} = nT_{SC} + \Delta T_{SC} - \Delta T_H. \quad \text{Eq. (8)}$$

where n is 0, 1, 2, or 3, depending on the phase of the color burst and the phase of the synthesized color burst relative to the start of the video line. The time difference $T_{DIFF}$ is provided to output resampler 150 and used to align the video picture. The time difference $T_{DIFF}$ can also be scaled by $4/T_{SC}$ to produce a time difference value (td) having a unit of number of resampling clock periods (i.e., td=4 $T_{DIFF}/T_{SC}$). The td value is in the unit of the 4 $f_{SC}$ resampling domain, and may be more readily applied to the timing circuit used to generate the output resampling signal.

As shown in FIG. 7A, a control circuit 722 receives an output sampling clock (e.g., from a clock source 720) and the time difference $T_{DIFF}$ from control circuit 422 in FIG. 4A. Control circuit 722 generates an output resampling signal that is provided to resampling circuit 714. Control circuit 712 can be implemented similar to that shown in FIG. 4B.

Figure 7C:
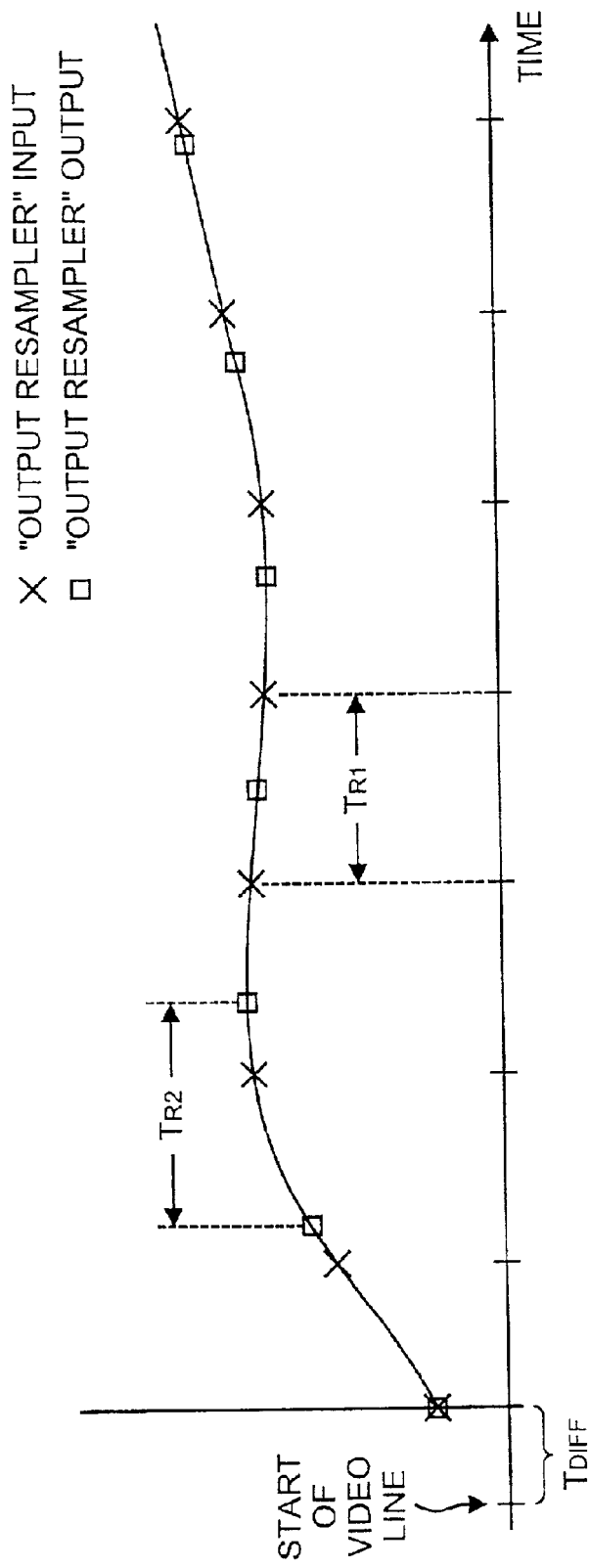
FIG. 7C shows a diagram that illustrates the resampling performed by the output resampler.

FIG. 7C shows a diagram that illustrates the resampling performed by output resampler 150. As shown in FIG. 7B, the input samples into resampler 150 (represented by "x") are spaced by $T_{R1}$ which is inversely related to the input resampling rate (or $T_{R1}=1/f_{R1}$). The input samples are resampled by resampler 150 to generate output video samples (represented by "0"s). For a linear interpolator, resampling is achieved in accordance with equation (1) described above.

In accordance with an aspect of the invention, resampler 150 is designed to align the decoded picture to account for the phase error between the start of the video line and the burst phase. The time difference $T_{DIFF}$ can be added to the output sampling clock by a summer to generate the output resampling signal, similar to that shown in FIG. 4B (with the time difference $T_{DIFF}$ replacing the phase offset). As shown in FIG. 7B, the first active output sample is computed at the time difference from the start of the video line.

In embodiments in which the output samples are generated with a time offset (e.g., based on the time difference indicated by the control signal) to align the decoded picture, resampler 150 behaves as a skew compensation circuit. The skew compensation circuit may generate output samples having the same or different sample rate as that of the input samples.

Resampler 150 can be used as a scaler to provide output samples at a different horizontal sample rate or a different vertical sample rate, or both. The scaler can be used to provide, for example, picture-in-picture (PIP) feature.

Figure 8:
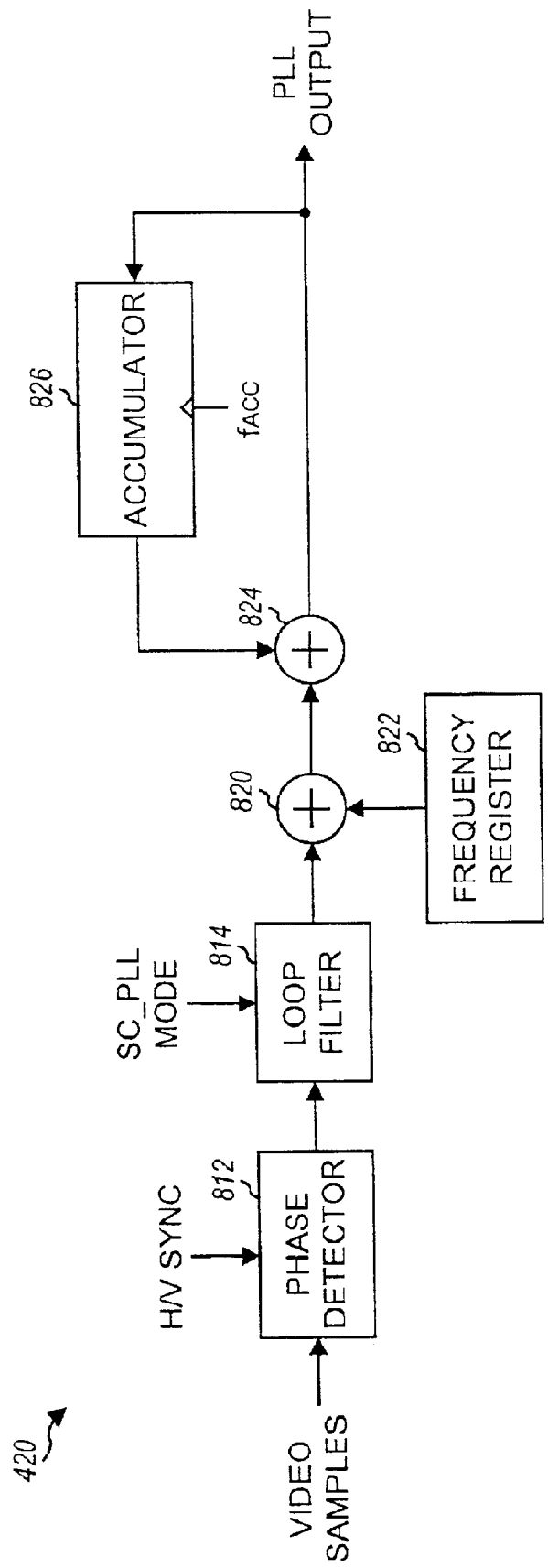
FIG. 8 shows a block diagram of an embodiment of a subcarrier PLL.

FIG. 8 shows a block diagram of an embodiment of subcarrier PLL 420 within timing circuit 124 (see FIG. 4A). The resampled video samples from resampler 120 are provided to a phase detector 812 that detects the phase error in the color bursts of the resampled video. When the resampling frequency $f_{R1}$ is phased-locked to the color subcarrier frequency $f_{SC}$ (e.g., $f_{R1}=4\ f_{SC}$), the resampled color bursts have a particular phase offset (e.g., zero) for each burst cycle. However, when the resampling frequency is not phased-locked to the color subcarrier frequency (e.g., $f_{R1} \neq 4\ f_{SC}$), the color bursts are sampled at varying locations and include varying phase errors. Phase detector 812 is enabled only for time intervals when color bursts are present, as determined from the H/V SYNC signals.

Phase detector 812 detects the color burst phase error and provides the detected phase error to a loop filter 814. In an embodiment, loop filter 814 operates in one of several operating modes (e.g., a fast mode and a slow mode), as determined by a control signal SC_PLL MODE. The fast mode has a wider loop bandwidth and provides shorter acquisition time and better frequency tracking when the signal is degraded. The fast mode can provide better performance for video signals from VCRs, especially during fast forward. However, if the bandwidth is excessively high, the color noise may be visible. The slow mode has a narrower loop bandwidth and provides reduced timing jitter caused by noise. The slow mode is typically used for higher quality video signals.

Loop filter 814 filters or averages the phase error and provides the filtered error to a summer 820. Summer 820 also receives a frequency value from a frequency register 822 and sums the two received values to generate an instantaneous frequency value that is provided to an NCO.

The NCO includes a summer 824 and an accumulator 826. Within the NCO, summer 824 receives the instantaneous frequency value from summer 820 and a phase value from accumulator 826 and sums the two received values to generate an instantaneous phase value. This phase value is provided as the PLL output and is also stored back to accumulator 826.

The NCO generates a synthesized clock signal from a reference (fixed) clock signal $f_{ACC}$. The reference clock signal can be the same as the sampling clock signal, or $f_{ACC}=f_{SAMP}$. The synthesized clock signal is then used to generate the resampling signal for resampler 120. The frequency of the synthesized clock signal can be expressed as follows:

$$f_{RI} = \frac{f_{VALUE}}{2^{ACC}} \cdot f_{ACC}, \qquad \text{Eq. (9)}$$

where $f_{VALUE}$ is the frequency value in register 822, $f_{ACC}$ is the frequency of the clock signal for accumulator 826, and ACC is the number of bits in accumulator 826.

The PLL output from adder 824 contains frequency and phase information of the synthesized clock signal used for resampling. The phase information is provided in the resampling signal used by resampler 120.

For both line PLL 320 and subcarrier PLL 420, the selection between the fast and slow modes can be based on a measured phase noise. For example, the detected phase error from phase detector 812 can be averaged over a frame and compared against a particular phase threshold. If the averaged phase error is greater than the phase threshold, suggesting a degraded video signal, the fast mode can be activated. Otherwise, if the averaged phase error is less than the phase threshold, suggesting a high quality video signal, the slow mode can be activated. Other indications of phase error can also be used, such as the sum of the square of the detected phase error. The phase measurement can also be performed on the filtered error from the loop filter (e.g., loop filter 814 in FIG. 8). Other criteria for selecting between the fast and slow modes can also be used (e.g., measurement of the noise during the horizontal sync tip) and are within the scope of the invention.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A video decoder for decoding a composite video signal comprising:
   an analog-to-digital converter (ADC) configured to receive and digitize the composite video signal to generate ADC samples;
   an input resampler operatively coupled to the ADC, the input resampler configured to receive and resample the ADC samples with a first resampling signal to generate resampled video samples;
   a Y/C separator coupled to the input resampler, the Y/C separator configured to receive and separate the resampled video samples into luminance and chrominance components, wherein the Y/C separator includes
      a delay element configured to receive the resampled video samples and provide a variable amount of delay.

2. The decoder of claim 1, wherein the variable amount of delay is adjustable from video line to video line.

3. The decoder of claim 1, wherein the variable amount of delay is based on an approximated duration of a video line.

4. The decoder of claim 1, wherein the variable amount of delay is selected to be (m·n+m/2) samples, where m is a ratio of frequencies of the resampling signal and a color subcarrier of the composite video signal, and n is an integer selected such that (m·n+m/2) samples most approximate the duration of a video line.

5. The decoder of claim 4, wherein the variable amount of delay is selected to be (4n+2) samples.

6. The decoder of claim 1, wherein the variable amount of delay is selected to be (m·n+3m/4) samples, where m is a ratio of frequencies of the resampling signal and a color subcarrier of the composite video signal, and n is an integer selected such that (m·n+3m/4) samples most approximate the duration of a video line.

7. The decoder of claim 6, wherein the variable amount of delay is selected to be (4n+3) samples.

8. The decoder of claim 1, wherein the first resampling signal is locked to color bursts of the composite video signal.

9. The decoder of claim 1, wherein the first resampling signal has a frequency four times that of a color subcarrier in the composite video signal.

10. The decoder of claim 1, wherein the input resampler is implemented as a linear interpolator.

11. The decoder of claim 1, wherein the Y/C separator includes
an adaptive comb filter configured to receive the resampled video samples and provide the luminance and chrominance samples, the adaptive comb filter including at least one delay element configurable to provide a variable amount of delay.

12. The decoder of claim 1, further comprising:
a color demodulator coupled to the Y/C separator, the demodulator configured to receive and demodulate the chrominance component into color difference components.

13. The decoder of claim 12, further comprising:
an output resampler coupled to the color demodulator, the output resampler configured to receive and resample the luminance and color difference components with a second resampling signal to generate output video components.

14. The decoder of claim 13, wherein the output resampler includes
a buffer configured to receive and store the luminance and color difference components, and
a resampling circuit coupled to the buffer and configured to resample the buffered luminance and color difference components with the second resampling signal to generate the output video components.

15. The decoder of claim 13, wherein the second resampling signal is dependent on an output sampling clock.

16. The decoder of claim 15, wherein the output sampling clock has a fixed frequency.

17. The decoder of claim 1, further comprising:
a sync processor configured to receive the ADC samples and generate horizontal and vertical sync signals.

18. The decoder of claim 17, further comprising:
a timing circuit coupled to the input resampler, the timing circuit configured to receive the resampled video samples and generate the first resampling signal.

19. The decoder of claim 18, wherein the timing circuit includes:
a first phase lock loop (PLL) configured to receive a first reference clock signal and generate a first synthesized clock signal; and
a first control circuit coupled to the first PLL, the first control circuit configured to receive the first synthesized clock signal and generate the first resampling signal.

20. The decoder of claim 19, wherein the first PLL is further configurable to operate in one of a plurality of operating modes, the operating modes including a fast mode and a slow mode.

21. The decoder of claim 19, wherein the control circuit within the timing circuit is further configured to receive and incorporates a phase offset value into the first resampling signal.

22. The decoder of claim 18, wherein the timing circuit is further configured to estimate the duration of a video line.

23. The decoder of claim 18, wherein the timing circuit is further configured to receive the horizontal sync signal and generate a first control signal indicative of a time difference between a start of a video line and a burst phase for the video line.

24. A video decoder for decoding a composite video signal comprising:
an input sampling circuit configured to receive and digitize the composite video signal to generate video samples;
a color decoder coupled to the input sampling circuit, the color decoder configured to receive and decode the video samples to generate decoded video components;
a timing circuit coupled to the input sampling circuit, the timing circuit configured to receive the video samples and generate a control signal indicative of an approximated time difference between a start of a video line and a burst phase of the video line; and
a skew compensation circuit coupled to the color decoder and the timing circuit, the skew compensation circuit configured to receive the decoded video components and the control signal and to generate output video components having a time offset based on the time difference indicated by the control signal.

25. The decoder of claim 24, wherein the input sampling circuit includes
an analog-to-digital converter (ADC) configured to receive and digitize the composite video signal to generate ADC samples, and
an input resampler coupled to the ADC, the input resampler configured to receive and resample the ADC samples with a first resampling signal to generate the video samples.

26. The decoder of claim 25, wherein the first sampling signal is locked to color bursts of the composite video signal.

27. The decoder of claim 24, wherein the color decoder includes
a Y/C separator coupled to the input sampling circuit, the Y/C separator configured to receive and separate the video samples into luminance and chrominance components, and
a color demodulator coupled to the Y/C separator, the demodulator configured to receive and demodulate the chrominance component into color difference components,
wherein the luminance and color difference components comprise the decoded video components.

28. A video decoder for decoding a composite video signal comprising:
an input sampling circuit configured to receive and digitize the composite video signal with a first sampling signal to generate video samples;
a color decoder coupled to the input sampling circuit, the color decoder configured to receive and decode the video samples to generate decoded video components; and a timing circuit coupled to the input sampling circuit, the timing circuit configured to receive a reference clock signal and generate the first sampling signal, the timing circuit including a phase lock loop (PLL) configured to receive the reference clock signal and a mode control signal, wherein the PLL is configurable to operate in one of a plurality of operating modes indicated by the mode control signal.

29. The decoder of claim 28, wherein the plurality of operating modes are associated with different loop characteristics.

30. The decoder of claim 28, wherein the plurality of operating modes include a fast mode and a slow mode, wherein the fast mode is characterized by a fast loop response and the slow mode is characterized by a slow loop response.

31. The decoder of claim 30, wherein the PLL is further configurable to switch to the fast mode when an averaged PLL phase error exceeds a particular threshold.

32. The decoder of claim 28, wherein the input sampling circuit includes an analog-to-digital converter (ADC) configured to receive and digitize the composite video signal to generate ADC samples, and an input resampler coupled to the ADC, the input resampler configured to resample the ADC samples with a first resampling signal to generate the video samples.

33. The decoder of claim 28, wherein the color decoder includes a Y/C separator coupled to the input sampling circuit, the Y/C separator configured to receive and separate the video samples into luminance and chrominance components, and a color demodulator coupled to the Y/C separator, the demodulator configured to receive and demodulate the chrominance component into color difference components, wherein the luminance and color difference components comprise the decoded video components.

34. A video decoder for decoding a composite video signal comprising:

an input resampler configured to receive and resample input video samples with a first resampling signal to generate resampled video samples, wherein the input video samples are generated by digitizing the composite video signal at a first frequency, and wherein the first resampling signal is locked to color bursts of the composite video signal;

a Y/C separator coupled to the input resampler, the Y/C separator configured to receive and separate the resampled video samples into luminance and chrominance components;

a color demodulator coupled to the Y/C separator, the demodulator configured to receive and demodulate the chrominance component into color difference components; and an output resampler coupled to the color demodulator, the output resampler configured to receive and resample the luminance and color difference components with a second resampling signal to generate output video components, wherein the second resampling signal is locked to a line rate of the composite video signal.

35. The decoder of claim 34, further comprising:

a sync processor coupled to the input resampler, the sync processor configured to receive the input video samples and generate horizontal and vertical sync signals.

36. The decoder of claim 35, further comprising:

a timing circuit coupled to the input resampler, the timing circuit configured to receive the resampled video samples and generate the first resampling signal.

37. The decoder of claim 36, wherein the timing circuit is further configured to receive the horizontal sync signal and generate a first control signal indicative of a time difference between a start of a video line and color burst for the video line.

38. The decoder of claim 37, wherein the output resampler is further configured to receive the first control signal and to adjust horizontal alignment of a decoded video line based on the first control signal.

39. The decoder of claim 35, wherein the sync processor includes a second phase lock loop (PLL) configured to receive a second reference clock signal and generate a second synthesized clock signal, and a second control circuit coupled to the second PLL, the second control circuit configured to receive the second synthesized clock signal and generate the second resampling signal.

40. The decoder of claim 39, wherein the second PLL is further configurable to operate in one of a plurality of operating modes, the operating modes including a fast mode and a slow mode.

41. The decoder of claim 34, wherein the output resampler provides a fixed number of samples per video line.

42. The decoder of claim 34, wherein the input resampler is implemented as a linear interpolator.

43. The decoder of claim 34, wherein the output resampler includes a scan rate converter configured to receive the luminance and color difference components and to generate output video components having a output sample rate that is lower than that of the resampled video samples.

* * * * *